(12) United States Patent
Lomask et al.

(10) Patent No.: US 7,769,546 B2
(45) Date of Patent: Aug. 3, 2010

(54) METHOD FOR INDEXING A SUBSURFACE VOLUME FOR THE PURPOSE OF INFERRING GEOLOGIC INFORMATION

(75) Inventors: Jesse Lomask, San Ramon, CA (US); James Rickett, Oakland, CA (US); Julian Clark, Oakland, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 263 days.

(21) Appl. No.: 12/029,216

(22) Filed: Feb. 11, 2008

(65) Prior Publication Data

US 2009/0204332 A1   Aug. 13, 2009

(51) Int. Cl.
*G01V 1/28* (2006.01)

(52) U.S. Cl. ............... 702/14; 367/72; 367/73

(58) Field of Classification Search .......... 702/5, 702/14, 16; 703/2, 10; 367/69, 72–73
See application file for complete search history.

(56) References Cited

U.S. PATENT DOCUMENTS

| | | | | |
|---|---|---|---|---|
| 5,251,184 A * | 10/1993 | Hildebrand et al. | ........... | 367/72 |
| 5,615,171 A * | 3/1997 | Hildebrand | ........... | 367/72 |
| 5,838,634 A * | 11/1998 | Jones et al. | ........... | 367/73 |
| 6,640,190 B2 * | 10/2003 | Nickel | ........... | 702/14 |
| 6,708,118 B2 | 3/2004 | Stark | | |
| 6,850,845 B2 | 2/2005 | Stark | | |
| 6,853,922 B2 | 2/2005 | Stark | | |
| 2008/0015784 A1 * | 1/2008 | Dorn et al. | ........... | 702/16 |
| 2009/0157322 A1 * | 6/2009 | Levin | ........... | 702/16 |

OTHER PUBLICATIONS

Bienati, N., et al., Automatic Horizon Picking Algorithms for Multidimensional Data, EAGE $61^{st}$ Conference and Technical Exhibition—Helsinki, Finland, Jun. 7-11, 1999.
Bienati, N., et al., Horizon picking for multidimensional data: an integrated approach, SBGf, SBGf35999, Dip. Elettronica e informazione, pp. 1-2.
Bienati, N., et al., Multidimensional Wavefront Estimation from Differential Delays, IEEE Transactions on Geoscience and Remote Sensing, vol. 39, No. 3, Mar. 2001, pp. 655-664.
Bienati, N., et al., Traveltime Picking in 3D Data Volumes, Eage $60^{th}$Conference and Technical Exhibition, Leipzig, Germany, Jun. 8-12, 1998.

(Continued)

*Primary Examiner*—Hal D Wachsman
*Assistant Examiner*—Mary C Baran
(74) *Attorney, Agent, or Firm*—Carlos L. Hanze (57) ABSTRACT

A method of determining a horizon volume. In one embodiment, the horizon volume is determined from obtained seismic information, and maps the obtained seismic information onto a flattened volume such that in the flattened volume, horizons represented in the obtained seismic information are shifted to be substantially coplanar with a surface defined by the horizon volume as an estimate of a single chronostratigraphic time such that the parameters of the flattened volume include (i) a two-dimensional position in a surface plane, and (ii) a metric related to chronostratigraphic time.

27 Claims, 7 Drawing Sheets

OTHER PUBLICATIONS

Blinov, a., et al., Reconstruction of 3-D Horizons From 3-D Seismic Datasets, IEEE Transactions on Geoscience and Remote Sensing, vol. 43, No. 6, Jun. 2005, pp. 1421-1431.

Ghiglia, D., et al., Two-Dimensional Phase Unwrapping Theory, Algorithms, and Software, Goldstein's Branch Cut Algorithm, pp. v-vii, pp. 107-117.

Ghiglia, D.C., et al., Robust two-dimensional weighted and unweighted phase unwrapping that uses fast transforms and iterative methods, Optical Society of America, vol. 11, No. 1, Jan. 1994, pp. 107-117.

Lomask, J. et al., Flattening without picking, Geophysics, vol. 71, No. 4 (Jul.-Aug. 2006), pp. P13-P20.

Lomask, J., et al., Flattening without picking, Stanford Exploration Project, Report 112, Nov. 11, 2002, pp. 141-151.

Lomask, J., et al., Volumetric flattening: an interpretation tool, The Leading Edge, Jul. 2007, pp. 888-897.

Lomask, J., Flattening 3-D data cubes in complex geology, Stanford Exploration Project, Report 113, Jul. 8, 2003, pp. 247-261.

Lomask, J., Flattening 3-D seismic cubes without picking.

Lomask, J., Seismic Volumetric Flattening and Segmentation, A Dissertation submitted to the Department of Geophysics and the Committee on Graduate Studies of Stanford University in Partial Fulfillment of the Requirements for the Degree of Doctor of Philosophy, Oct. 2006, pp. ii-xx, pp. 1-134.

Stark, T., Relative geologic time (age) volumes—Relating every seismic sample to a geologically reasonable horizon, The Leading Edge, Sep. 2004, pp. 928-932.

Wheeler, H., Time-Stratigraphy, Bulletin of the American Association of Petroleum Geologists, vol. 42, No. 5 (May, 1958), pp. 1047-1063.

Zeng, H., et al., Stratal slicing, Part I: Realistic 3-D seismic model, Geophysics, vol. 63, No. 2 (Mar.-Apr. 1998), pp. 502-513.

Zeng, H. et al., Stratal slicing, Part II: Real 3-D Seismic Data, Geophysics, vol. 63, No. 2 (Mar.-Apr. 1998), p. 514-522.

\* cited by examiner

METHOD FOR INDEXING A SUBSURFACE VOLUME FOR THE PURPOSE OF INFERRING GEOLOGIC INFORMATION

RELATED APPLICATIONS

This application is related to U.S. patent application Ser. No. 12/029,196 entitled "Method for Determining Geological Information Related to a Subsurface Volume of Interest," and filed herewith, the contents of which are incorporated into this disclosure in their entirety.

FIELD OF THE INVENTION

The invention relates to systems and methods for determining geological information related to subsurface volumes of interest. In particular, the invention involves determining and adjusting a horizon volume that maps seismic information related to a subsurface volume of interest into a flattened volume.

BACKGROUND OF THE INVENTION

Techniques for determining information related to a rate of deposition at which strata present within a subsurface volume of interest were formed are known. However, these techniques generally require manual analysis of seismic data related to the subsurface volume of interest (e.g., manual picking of horizons within the seismic data) and/or imprecise computation, and typically result in data that is sparsely sampled and/or low resolution. As such the usefulness of implementing the determined information in the derivation of further geological information is impaired.

SUMMARY

One aspect of the invention relates to a computer-implemented method of determining a horizon volume of a subsurface volume. In one embodiment, the method comprises obtaining seismic information related to a subsurface volume, the obtained seismic information having data points that represent geological formations within the subsurface volume at an array of locations within the subsurface volume, wherein the parameters of the obtained information include (i) a two-dimensional position in a surface plane of the subsurface volume, and (ii) a metric related to seismic depth of the subsurface volume, and wherein the data points in the obtained seismic information are spaced along the metric related to seismic depth according to a sampling interval for the metric related to seismic depth; and determining a horizon volume from the obtained seismic information, wherein the horizon volume maps the obtained seismic information onto a flattened volume such that in the flattened volume, horizons represented in the obtained seismic information are shifted to be substantially coplanar with a surface defined by the horizon volume as an estimate of a single chronostratigraphic time such that the parameters of the flattened volume include (i) a two-dimensional position in the surface plane, and (ii) a metric related to chronostratigraphic time. In some instances, determining the horizon volume comprises analyzing the obtained seismic information to identify horizons in the subsurface volume that are represented in the obtained seismic data; creating an initial horizon volume that orders the identified horizons by chronostratigraphic time and that associates positions within an initial flattened volume with data points included in the obtained seismic information; analyzing the initial horizon volume to determine whether mapping the obtained seismic information into the initial flattened volume according to the initial horizon volume would compress the obtained seismic information by more than a predetermined amount, wherein compression occurs if two data points in the obtained seismic information (i) have the same two-dimensional position in the surface plane, (ii) are mapped by the initial horizon volume into the initial flattened volume at directly adjacent positions, and (iii) have a difference in the metric related to seismic depth that is greater than the sampling interval for the metric related to seismic depth; and adjusting the initial horizon volume if the mapping the obtained seismic information into the initial flattened volume according to the initial horizon volume compresses the obtained seismic information by more than a predetermined amount such that mapping the obtained seismic information into an adjusted flattened volume according to the adjusted horizon volume does not compress the obtained seismic information by more than the allowable amount.

Another aspect of the invention relates to a computer-implemented method of determining a flattened volume from a subsurface volume. In one embodiment, the method comprises obtaining seismic information related to a subsurface volume that represents geological formations within the subsurface volume; analyzing the obtained seismic information to automatically identify horizons in the subsurface volume that are represented in the obtained seismic information; creating an initial horizon volume from the obtained seismic information and the identified horizons, wherein the initial horizon volume maps the obtained seismic information into a flattened volume, wherein the parameters of the flattened volume include (i) two-dimensional position on a surface that corresponds to a single chronostratigraphic time, and (ii) a metric related to chronostratigraphic time, and wherein a given one of the identified horizons is represented in the flattened volume as a surface that is substantially planar, substantially perpendicular to an axis corresponding to the metric related to chronostratigraphic time, and intersects the axis at a position corresponding to the chronostratigraphic time at which geological material of the given horizon was deposited within the subsurface volume; analyzing the initial horizon volume to determine if mapping the obtained seismic information into the flattened volume according to the initial horizon volume results in compression of the obtained seismic information that omits at least some of the obtained seismic information from the flattened volume; and adjusting the initial horizon volume to alleviate detected compression of the obtained seismic information during mapping of the obtained seismic information onto the flattened volume.

Another aspect of the invention relates to a computer-implemented method of determining a horizon volume of a subsurface volume. In one embodiment, the method comprises obtaining seismic information related to a subsurface volume that represents geological formations within the subsurface volume; analyzing the obtained seismic information volume to automatically identify horizons within the subsurface volume that are represented in the obtained seismic information; creating an initial horizon volume from the obtained seismic information and the identified horizons, wherein the initial horizon volume maps the obtained seismic information into a flattened volume, wherein the parameters of the flattened volume include (i) two-dimensional position on a surface that corresponds to a single chronostratigraphic time, and (ii) a metric related to chronostratigraphic time, and wherein a given one of the identified horizons is represented in the flattened volume as a surface that is substantially planar, substantially perpendicular to an axis corresponding to the metric related to chronostratigraphic time, and intersects the axis at a position corresponding to the chronostratigraphic time at which geological material of the given horizon was deposited within the subsurface volume; and adjusting the horizon volume to expand, in the flattened volume, the spacing between a pair of the identified horizons along the axis that corresponds to the metric related to chronostratigraphic time.

Another aspect of the invention relates to a computer-implemented method of determining a horizon volume. In one embodiment, the method comprises obtaining seismic information related to a subsurface volume that represents geological formations within the subsurface volume; analyzing the obtained seismic information to automatically identify a plurality of horizons within the subsurface volume that are represented in the obtained seismic data; creating a horizon volume from the identified horizons that orders the identified horizons according to chronostratigraphic time of deposition; comparing a density of the identified horizons in the horizon volume with a predetermined density threshold; and adjusting the horizon volume such that the density of the identified horizons in the horizon volume is greater than the predetermined density threshold if the density of the identified horizons in the horizon volume is initially less than the predetermined density threshold.

Another aspect of the invention relates to a computer-implemented method of determining a horizon volume. In one embodiment, the method comprises obtaining seismic information related to a subsurface volume that represents geological formations within the subsurface volume; analyzing the obtained seismic information to automatically identify a plurality of horizons within the subsurface volume that are represented in the obtained seismic information; creating a horizon volume from the identified horizons that orders the identified horizons according to chronostratigraphic time of deposition; and adjusting the horizon volume such that the identified horizons are indexed in the horizon volume by chronostratigraphic time of deposition uniformly as a function of chronostratigraphic time of deposition.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Reflection seismology (or seismic reflection) is a method of exploration geophysics that uses the principles of seismology to estimate the properties of a subsurface volume of interest within the Earth's subsurface from seismic waves directed to and reflected from the subsurface volume of interest. The method generally requires a source of seismic waves, such as explosives (e.g., dynamite/Tovex), a specialized air gun, a Vibroseis, and/or other sources. The source is used to introduce seismic waves into the subsurface volume of interest (usually at the surface), and data is acquired by an array of seismometers (usually disposed at the surface) that detect reflections of the seismic waves generated by the source as they arrive at the surface of the subsurface volume. The data acquired by the seismometers is then processed (e.g., migrated, etc.) to form a seismic data cube, which represents geological formations present within the subsurface volume at an array of data points within the subsurface volume. Since the data points within the seismic data cube are typically highly spatially sampled, the seismic data cube is effectively an image of the strata present in the subsurface volume of interest. It should be appreciated that in some instances, the seismic data can include fewer than the three dimensions of the seismic data cube discussed herein (e.g., one or two dimensional seismic data), and/or it can include a time dimension as well as spatial dimensions.

Figure 1:
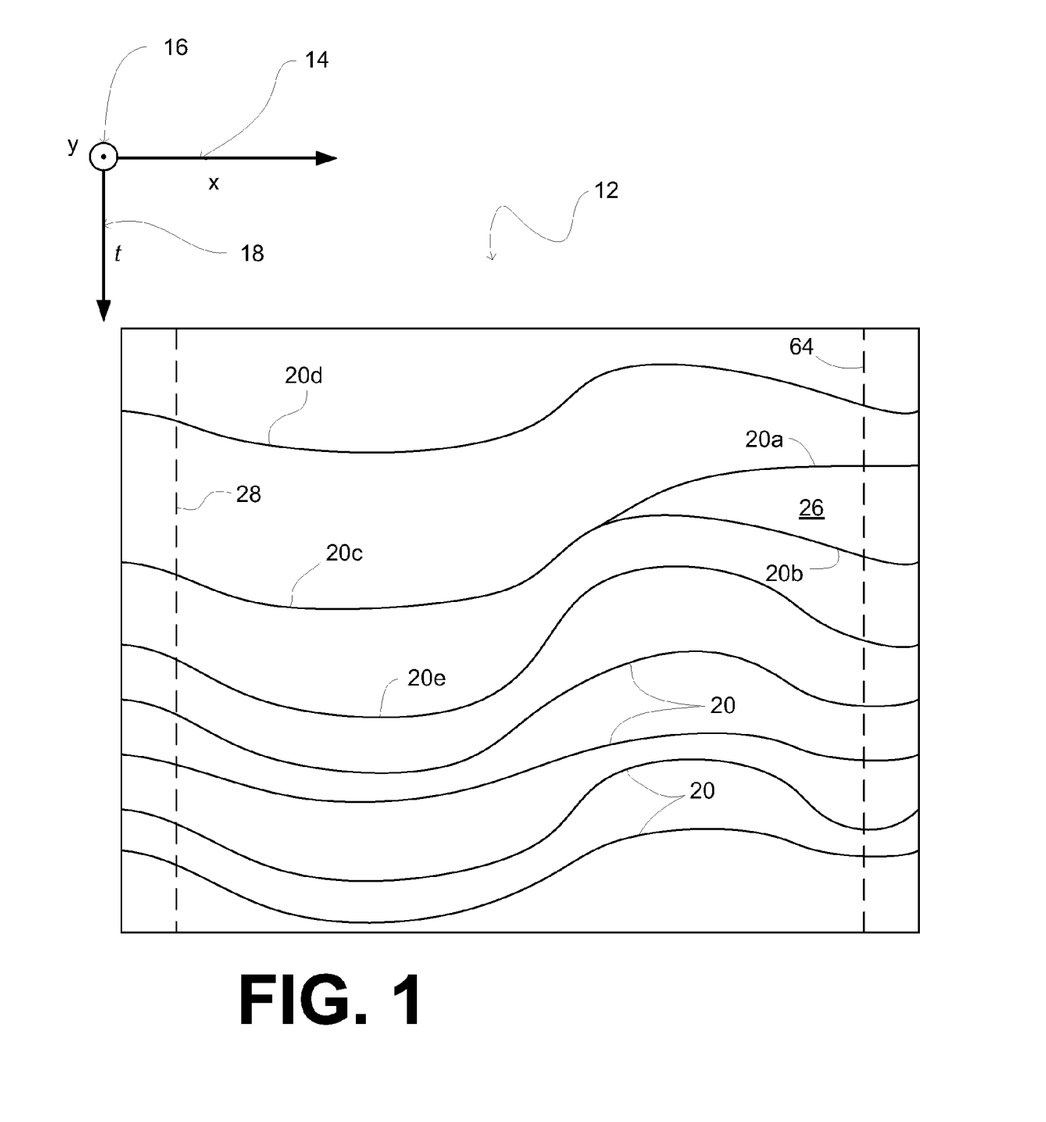
FIG. 1 illustrates a graphical representation of seismic information related to a subsurface volume of interest that represents geological formations within subsurface volume of interest, according to one embodiment of the invention.

By way of illustration, FIG. 1 illustrates an elevation view of a graphical representation of seismic information related to a subsurface volume of interest 12 that represents geological formations within subsurface volume of interest 12 (e.g., a seismic data cube obtained from performing reflection seismology on subsurface volume of interest 12). While the graphical representation provided by FIG. 1 depicts the seismic information as being contiguous, typically seismic information will represent geological formations within subsurface volume of interest 12 at an array of data points within subsurface volume of interest 12. However, due to the high spatial sampling of the seismic information (e.g., the proximity of the data points), the information can be represented as contiguous for illustrative purposes. Further, although FIG. 1 only provides a two-dimensional view of the graphical representation of the seismic information, this is purely for illustrative purposes, and it should be appreciated that a three-dimensional view could be provided with an additional dimension into and out of the plane of the figure. For instance, in one embodiment, the parameters of the seismic information that represents geological formations within subsurface volume of interest 12 are a two-dimensional position in a surface plane of subsurface volume of interest 12 (e.g., an x-axis 14, and a y-axis 16 that is orthogonal to the plane of FIG. 1) and a metric related to the seismic depth of subsurface volume of interest 12 (e.g., a t-axis 18, where t represents seismic time). The metric related to the seismic depth of subsurface volume of interest 12 may be a seismic time, which is defined as the time it takes seismic waves to travel from a point in subsurface volume of interest 12 to the surface, or a seismic depth.

The data points in the seismic information represented in FIG. 1 are spaced along t-axis 18 according to a sampling interval for the metric related to seismic depth. Since the data points are derived from detectors monitoring seismic impulses at the surface of subsurface volume of interest 12, an initial sampling interval will be related to an amount of (seismic) time between samples received and/or taken by the detectors. The initial sample interval may be changed during processing of the seismic information represented in FIG. 1. For example, a change in the sample interval may occur during a transfer of the data points from seismic time to depth. This amount of time (i.e., the sampling interval), in one embodiment corresponds to a sampling rate of the detectors that are recording the seismic data from subsurface volume of interest 12. In one embodiment, the sampling interval corresponds to a minimum wavelength of the seismic waves that reflect from within subsurface volume of interest 12 and travel back up to the surface for detection by the detectors, as smaller wavelengths tend to be attenuated by subsurface strata.

As can be seen in FIG. 1, subsurface volume of interest 12 includes a plurality of horizons 20. A horizon is a surface formed at a boundary between two layers of differing composition within the strata of subsurface volume of interest 12. Since horizons 20 represent boundary changes in the composition of the strata of subsurface volume of interest 12, it is assumed for analysis purposes that each horizon 20 represents a surface within subsurface volume of interest 12 that was deposited at a common chronostratigraphic time. This is reasonable because the impetus for a composition change in the strata being deposited in one area of subsurface volume of interest 12 would likely be an impetus for a similar change in the composition of strata being deposited in another area of subsurface volume of interest 12. Particularly where the boundaries indicating such a change in composition for both areas connect and/or are of similar depth within subsurface volume of interest 12.

At a given point on a horizon (or some other surface in subsurface volume of interest 12 that correspond to a single chronostratigraphic time), the horizon (or other surface) can be described in terms of its location (e.g., x,y,t coordinates) and its "dip." The "dip" is a measurement of the orientation of the horizon with respect to the horizontal (or some other planar surface, typically perpendicular to the "strike"). For example, in FIG. 1 the dip of a given one of horizons 20 can be characterized by two components, an x-dip, or the angle of the given horizon 20 with respect to x-axis 14, and a y-dip, or the angle of the given horizon 20 with respect to y-axis 16.

As is show in FIG. 1, horizons 20 within subsurface volume of interest 12 generally have undulations and/or discontinuities. Some of these undulations and/or discontinuities may be caused by various phenomena associated with the deposition of the strata. These phenomena include, for example, variable sedimentation rates, variable erosion rates, surface undulations at the time of deposition, variable lithologic composition, and/or other phenomena. The undulations and/or discontinuities, in some cases, may be the result of various subsurface forces that impact the shape of horizons 20. These phenomena may include, for example, seismic activity, volcanic activity, ground water flow, subsurface sediment flow (e.g., salt movement), non-uniform loading, variable compaction rates, variable rates of diagenetic consolidation, tectonically driven deformation (e.g., folding and/or faulting), and/or other phenomena.

Figure 2:
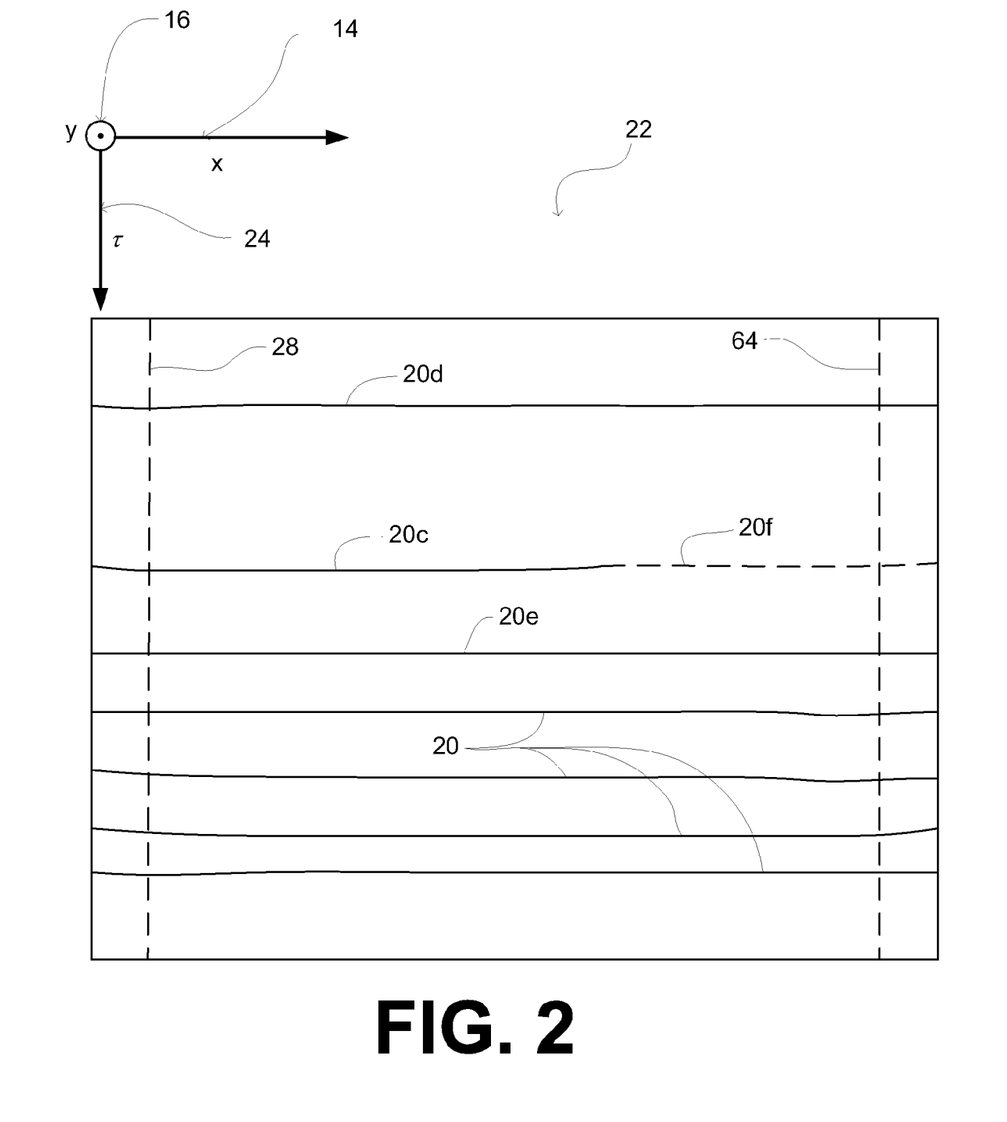
FIG. 2 illustrates an elevation view of a graphical representation of a flattened volume that corresponds to a subsurface volume of interest, according to one embodiment of the invention.

By analyzing seismic information that represents geological formations (e.g., horizons 20, layers of strata between horizons 20, etc.) within subsurface volume of interest 12, geological information related to subsurface volume of interest 12 can be determined. One technique employed to analyze such information is generally referred to as "flattening." By way of example, FIG. 2 illustrates an elevation view of a graphical representation of flattened volume 22 that corresponds to subsurface volume of interest 12. In flattened volume 22, some or all of horizons 20 present in subsurface volume of interest 12 are reshaped to correspond to some common shape. The common shape is coplanar with a surface defined by the horizon volume as an estimate of a single chronostratigraphic time of deposition. In flattened volume 22 show in FIG. 2, horizons 20 have been reshaped to be coplanar with a surface that is planar and horizontal.

Since each of horizons 20 is considered to represent a surface within subsurface volume of interest 12 that was deposited at a common chronostratigraphic time, the vertical axis of flattened volume 22 (illustrated in FIG. 2 and referred to hereafter as chronostratigraphic time axis 24) becomes a metric related to chronostratigraphic time of deposit, rather than seismic depth. More specifically, the parameters of flattened volume 22 are a two-dimensional position in the surface plane of flattened volume 22, and a metric related to information related to chronostratigraphic time of deposit.

Although in FIG. 2, horizons 20 have been flattened to be substantially coplanar with a surface that is planar and orthogonal to chronostratigraphic time axis 24, this should not be viewed as limiting. In some instances, horizons 20 may be flattened to be substantially coplanar with a surface that is one or both of non-planar and/or non-orthogonal to chronostratigraphic time axis 24 (e.g., flattened to a surface that corresponds to the shape of one of horizons 20 in subsurface volume of interest 12).

By viewing the obtained seismic information in the form of flattened volume 22, an interpreter (e.g., a user, such as a geologist or geophysicist, a computer, etc.) can view geological features within subsurface volume of interest 12 as they were laid down originally. For example, after flattening, an interpreter could view an entire flood plain complete with meandering channels in a single image.

One technique for flattening obtained seismic information is described, for example, in *"Flattening without picking,"* Lomask et al., *Stanford Exploration Project*, Report 112, Nov. 11, 2002, pgs. 141-151; *"Flattening 3-D data cubes in complex geology,"* Lomask, *Stanford Exploration Project*, Report 113, Jul. 8, 2003, pgs. 247-261; *"Flattening without picking,"* Lomask et al, *Geophysics*, Vol. 71, No. 4 (July-August 2006), pgs. 13-20; and *"Volumetric flattening: an interpretation tool,"* Lomask et al, *The Leading Edge*, July 2007, pgs. 888-897 (referred to collectively hereafter as "Lomask"). These publications are incorporated into this disclosure in their entirety. As is discussed in Lomask, when the flattening technique described therein is applied to obtained seismic information, the result includes a "horizon volume." As used herein, a horizon volume is a data set that maps the obtained seismic information into flattened volume 22, and vice versa. As such, in one embodiment, the horizon volume can be conceptualized as a function that provides a position within the seismic information (e.g., (x,y,t)) that corresponds to a given location in flattened volume 22 as a function of its position within flattened volume 22 (e.g., (x,y,τ)). Since the two-dimensional location in a surface plane (e.g., x,y coordinates in FIGS. 1 and 2) do not change between subsurface volume of interest 12 and flattened volume 22, the designation of t for a given location (x,y,τ) in flattened volume 22 enables the information from the designated t with the same two-dimensional surface position of the given location in subsurface volume of interest 12 (e.g., the same x and y) to be mapped into flattened volume 22 at the given location within flattened volume 22.

As was mentioned above, generally, seismic information will represent geological formations within subsurface volume of interest 12 at an array of data points within subsurface volume of interest 12. Therefore, another manner of conceptualizing the horizon volume is as an index of the data points in the obtained seismic information that are included in flattened volume 22, where the index designates a position of the data point in the seismic information related to subsurface volume of interest 12 that should be mapped into a given location of flattened volume 22.

Some techniques for flattening the seismic information may result in some of the seismic information being omitted from the corresponding flattened volume. This includes the omission of one or more data points present in the seismic information from the corresponding flattened volume. In this disclosure, the omission of seismic information from the corresponding flattened volume is referred to as "compression" of the seismic information during flattening.

By way of illustration, FIG. 1 shows a given pair of horizons 20a and 20b that emerge from a source horizon 20c, and bound a region 26 which may be compressed by flattening. According to various techniques for flattening seismic information, including the technique described in Lomask, the spacing of horizons within a flattened volume is determined, at least initially, along a vertical reference trace 28 through subsurface volume of interest 12. However, if vertical reference trace 28 is not taken through subsurface volume of interest 12 at a location where the spacing between each of horizons 20 is greatest, then seismic information related to subsurface volume of interest 12 will be omitted by the flattening.

For example, in FIG. 1, such techniques would dictate that the spacing between source horizon 20c and horizons 20d and 20e (which are adjacent to source horizon 20c along vertical reference trace 28) be maintained throughout the corresponding flattened volume. As can be seen from FIG. 2, the maintenance of the spacing of horizons 20c, 20d, and 20e along vertical reference trace 28 within flattened volume 22 causes region 26 between the separate horizons 20a and 20b to be compressed in flattened volume 22 to a single horizon 20f.

Compression of seismic information during flattening typically reduces the accuracy and/or usefulness of the flattened seismic information represented by the resulting flattened volume. The compression of seismic information can be detected by an analysis of a horizon volume that maps the seismic information into a flattened volume, and/or by an analysis of the seismic information and the corresponding flattened volume.

Figure 3:
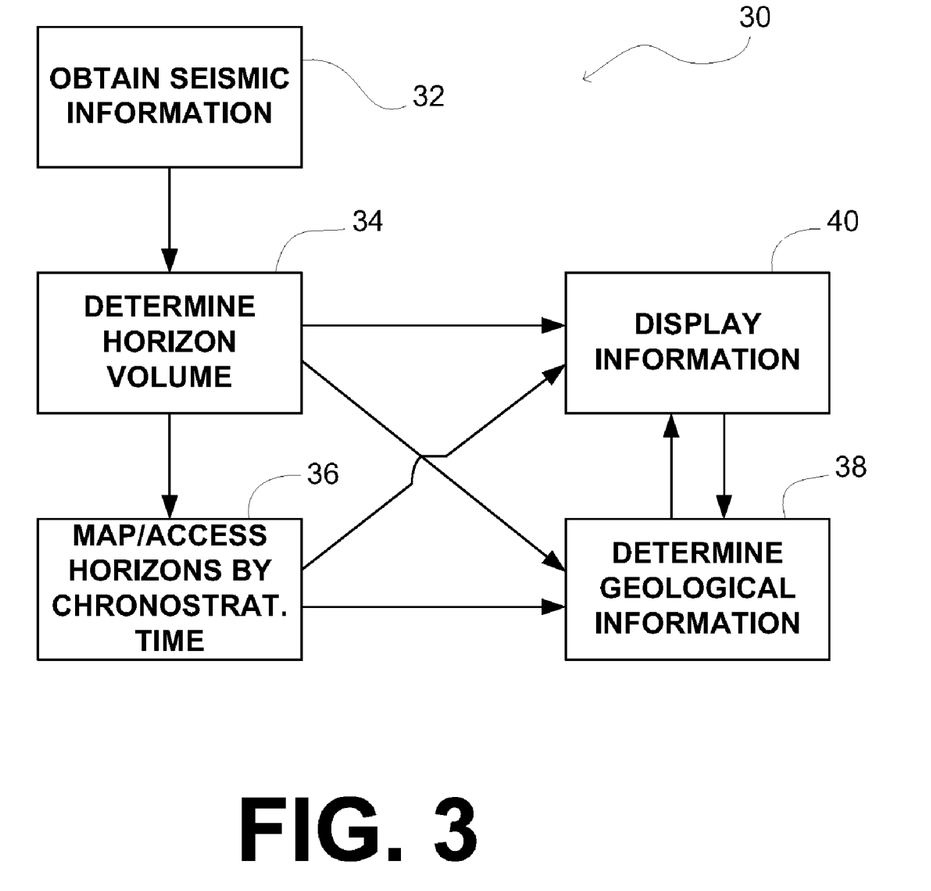
FIG. 3 illustrates a method of determining a horizon volume for a subsurface volume of interest, and processing the horizon volume to derive geological information related to the subsurface volume of interest, in accordance with one embodiment of the invention.

FIG. 3 illustrates a method 30 of determining a horizon volume and processing the horizon volume to extract geological information related to a subsurface volume of interest. In the description of method 30 and one or more of its operations below, specific reference is made to the flattening techniques described in Lomask. However, this should not be viewed as limiting. Instead, method 30 should be appreciated as being usable with a variety of different flattening techniques. Further, the particular arrangement of the operations of method 30 illustrated in FIG. 3 and described hereafter is not intended to be limiting. In some implementations, various ones of the operations could be performed in an order other than the one set forth (or concomitantly with other ones of the operations), various ones of the operations may be combined with others and/or be omitted altogether, and/or various additional operations may be added without departing from the scope of the disclosure, as should be appreciated.

At an operation 32 of method 30, seismic information is obtained that is related to a subsurface volume of interest that represents geological formations within the subsurface volume of interest. In one embodiment, the parameters of the obtained seismic information include a two-dimensional position in a surface plane, and a metric related to seismic depth. In some instances, the seismic information obtained at operation 32 represents geological formations present within the subsurface volume of interest at an array of data points within the subsurface volume. In one embodiment, the seismic information obtained at operation 32 includes a seismic data cube that represents the three-dimensional positions of geological formations present within the subsurface volume of interest.

At an operation 34, a horizon volume is determined that maps the seismic information obtained at operation 32 into a flattened volume such that in the flattened volume, horizons represented in the obtained seismic information are ordered according to chronostratigraphic time of deposition and are shifted to be substantially coplanar with a surface defined by the horizon volume as an estimate of a single chronostratigraphic time. As such, the coordinates of the flattened volume are a two-dimensional position in the surface plane, and a metric related to chronostratigraphic time of deposition. In one embodiment, the horizon volume maps the seismic information obtained at operation 32 into the flattened volume by specifying values of seismic time/depth in the obtained seismic information that correspond to positions within the flattened volume.

In one embodiment, the metric related to chronostratigraphic time of deposition is a relative measurement of chronostratigraphic time. This will typically be the case, since the horizon volume orders the horizons represented by the obtained seismic information according to chronostratigraphic time of deposition, but does not specify an actual value for chronostratigraphic time of deposition. However, in some instances, a user may specify a more absolute scale for the chronostratigraphic times of deposition to be applied to the relative metric provided initially by the horizon volume.

In one embodiment, the surface defined by the horizon volume as an estimate of a single chronostratigraphic time has a planar shape and is orthogonal to an axis that corresponds to the metric related to chronostratigraphic time. In one embodiment, the surface defined by the horizon volume as an estimate of a single chronostratigraphic time has a shape that corresponds to the shape(s) of one or more of the horizons represented by the obtained seismic information.

In one embodiment, method 30 includes an operation 36, at which the horizon volume determined at operation 34 is implemented to map the obtained seismic information into the flattened volume and/or to access the horizons represented by the obtained seismic information by chronostratigraphic time of deposition. As is illustrated in FIG. 2, and discussed above, the result of mapping the obtained seismic information into the flattened volume is that horizons represented by the obtained seismic information are shifted to be substantially coplanar with the surface defined by the horizon volume to be an estimate of a single chronostratigraphic time of deposition.

In one embodiment, method 30 includes an operation 38, at which geological information related to the subsurface volume of interest is determined from the horizon volume. Operation 38 may be performed automatically (e.g., according to some predetermined algorithm), manually (e.g., by a user analyzing the horizon volume), and/or by some combination of automatic and/or manual analysis. In one embodiment, the geological information includes one or more reservoir properties of the subsurface volume of interest (e.g., a porosity, a net-to-gross, a shale volume fraction, a permeability, etc.).

In one embodiment, method 30 includes an operation 40, at which information is displayed to users (e.g., via an electronic display). The information displayed at operation 40 may include information derived at one or more of operations 34 and/or 36. As such, the information displayed at operation 40 may enable the users to perform, and/or monitor or control the performance of operation 38. In some instances, operation 40 may include the display of geological information (other than, or in addition to, the geological information determined at one or more of operations 34 and/or 36) determined at operation 38. In such instances, operation 40 effects the display of the results (or partial results) of operation 38.

Figure 4:
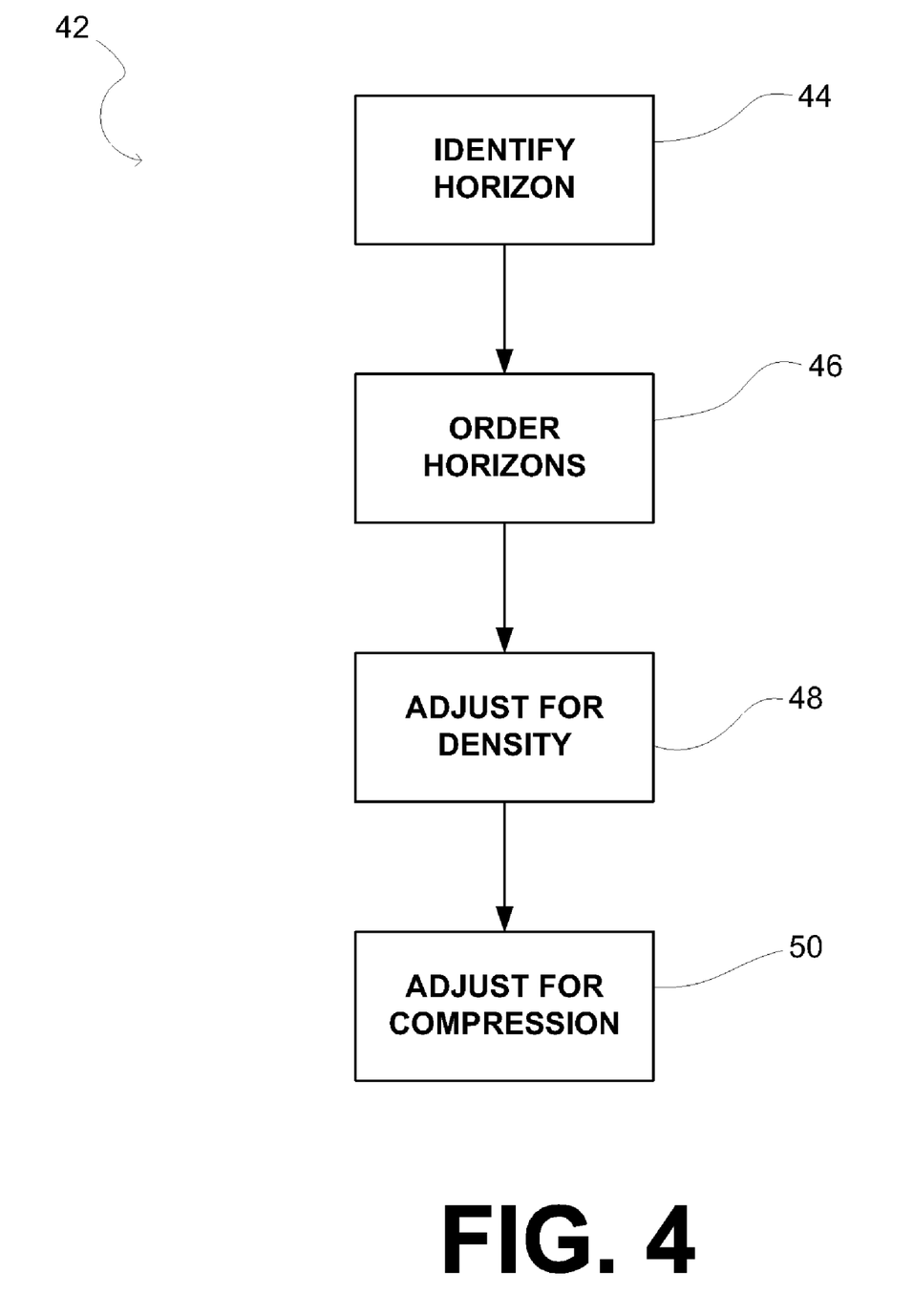
FIG. 4 illustrates a method of determining a horizon volume from seismic information related to a subsurface volume of interest, in accordance with one embodiment of the invention.

FIG. 4 illustrates a method 42 of determining a horizon volume. In one embodiment, method 42 is implemented in method 30 as operation 34. In the description of method 42 and one or more of its operations below, specific reference is made to the flattening techniques described in Lomask. However, this should not be viewed as limiting. Instead, method 42 should be appreciated as being usable with a variety of different flattening techniques. Further, the particular arrangement of the operations of method 42 illustrated in FIG. 4 and described hereafter is not intended to be limiting. In some implementations, various ones of the operations could be performed in an order other than the one set forth (or concomitantly with other ones of the operations), various ones of the operations may be combined with others and/or be omitted altogether, and/or various additional operations may be added without departing from the scope of the disclosure, as should be appreciated.

At an operation 44, previously obtained seismic information (e.g., at operation 32 shown in FIG. 3 and described above) is analyzed to identify horizons present in the subsurface volume of interest that are represented by the obtained seismic information. In one embodiment, identifying horizons at operation 44 includes interpreting individual horizons represented within the obtained seismic information by associating each of the data points in the seismic information that is on a given one of the identified horizons with the given horizon. For example, the horizons can be interpreted automatically according to the technique described in Lomask, or some other flattening technique.

At an operation 46, the horizons identified at operation 44 are ordered according to chronostratigraphic time of deposition. The order of the identified horizons with respect to chronostratigraphic time of deposition may be determined based on the relative positions of the identified horizons within the obtained seismic information. Ordering the horizons, in one embodiment, includes assigning values to the identified horizons for the metric related to chronostratigraphic time of deposition. This may include assigning values to the identified horizons for the metric related to chronostratigraphic time that indexes the horizons uniformly with respect to chronostratigraphic time of deposition (e.g., periodically, based on spacing between the horizons along the metric related to seismic depth, etc.). In one embodiment, the identified horizons are ordered automatically according to the technique described in Lomask, or some other flattening technique.

The identification and ordering of horizons at operations 44 and 46 results in a horizon volume that enables the identified horizons to be accessed/indexed according to chronostratigraphic time of deposition. Further, the horizon volume produced by operations 44 and 46 can be implemented to map the obtained seismic information into a flattened volume, as described above. However, in some instances, this horizon volume may be further refined according to one or both of operations 48 and/or 50.

In one embodiment, method 42 includes an operation 48, at which the horizon volume generated by operations 44 and 46 is adjusted such that the density of the horizons represented in the horizon volume is greater than or equal to a predetermined density threshold. The predetermined density threshold may be determined based on one or both of a user configurable setting or one or more parameters of the obtained seismic information (e.g., the sampling interval, etc.). The predetermined density threshold may be a density of the horizons represented in the horizon volume with respect to the metric related to seismic depth.

In one embodiment, method 42 includes an operation 50, at which the horizon volume is analyzed and/or adjusted to ensure that any compression of the obtained seismic information that occurs in mapping the seismic information to the flattened volume according to the horizon volume is less than a predetermined amount of compression. As has was set forth above with respect to FIGS. 1 and 2, compression of the obtained seismic information occurs if (i) two data points in the obtained seismic information have the same two-dimensional position in the surface plane of the subsurface volume of interest (e.g., they are on the same vertical trace), (ii) they are mapped by the horizon volume generated by operations 44 and 46 into the flattened volume at directly adjacent positions (e.g., they are mapped into adjacent chronostratigraphic times of deposition), and (iii) they have a difference in the metric related to seismic depth that is greater than the sampling interval of the obtained seismic data (e.g., there are intervening data points between these two data points in the seismic data that are omitted from the flattened volume). The predetermined amount of compression may be determined based on one or both of a user configurable setting or one or more parameters of the obtained seismic information (e.g., the sampling interval, etc.). In one embodiment, the predetermined amount of compression is zero.

Figure 5:
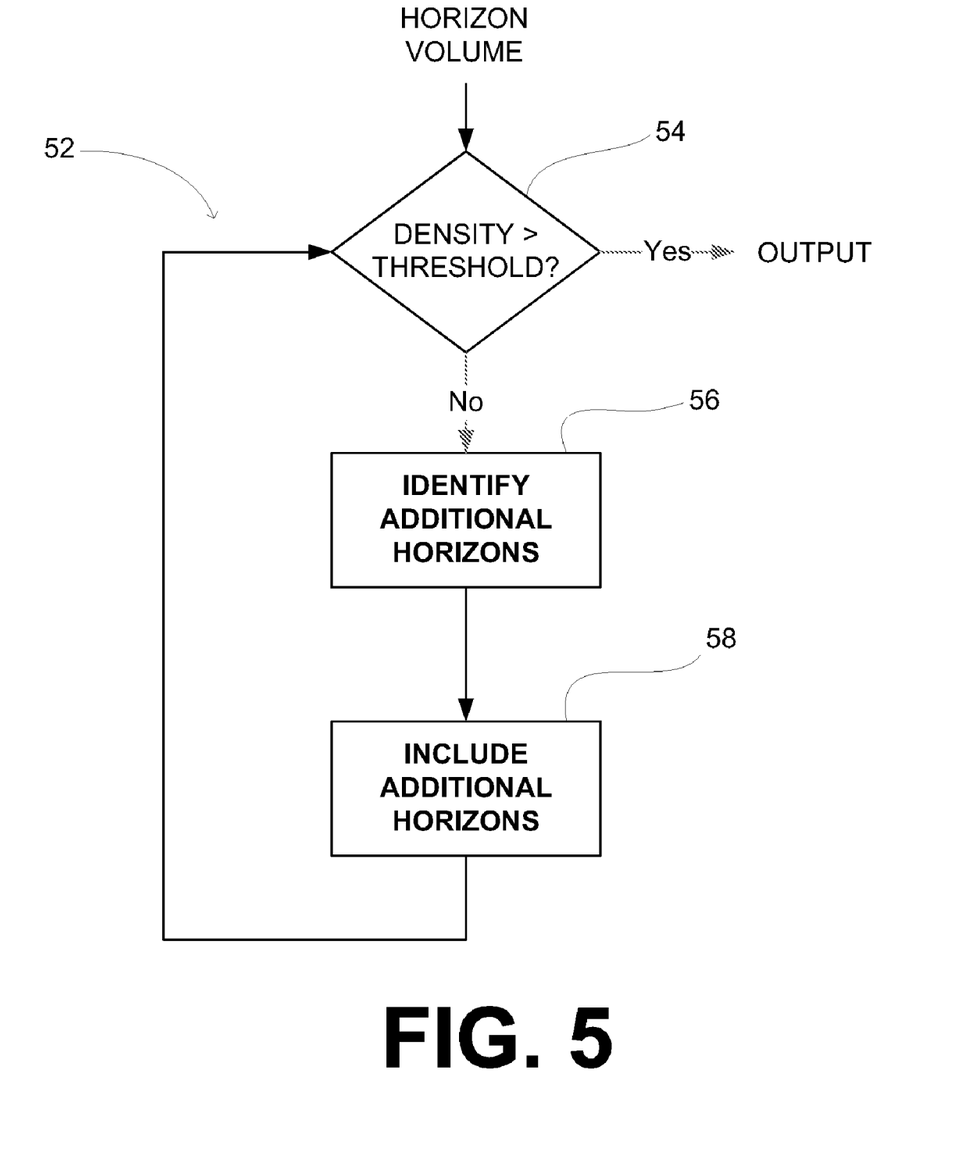
FIG. 5 illustrates a method of adjusting a density of horizons represented by a horizon volume, according to one embodiment of the invention.

FIG. 5 illustrates a method 52 of adjusting a density of horizons represented by a horizon volume. In one embodiment, method 52 is implemented in method 42 as at least part of operation 48. In the description of method 52 and one or more of its operations below, specific reference is made to the flattening techniques described in Lomask. However, this should not be viewed as limiting. Instead, method 52 should be appreciated as being usable with a variety of different flattening techniques. Further, the particular arrangement of the operations of method 52 illustrated in FIG. 5 and described hereafter is not intended to be limiting. In some implementations, various ones of the operations could be performed in an order other than the one set forth (or concomitantly with other ones of the operations), various ones of the operations may be combined with others and/or be omitted altogether, and/or various additional operations may be added without departing from the scope of the disclosure, as should be appreciated.

At an operation 54, a density of the horizons represented within a horizon volume is determined and compared with a predetermined density threshold. If the density of the horizons represented within the horizon volume is determined to be greater than the predetermined density threshold, operation 54 outputs the horizon volume (e.g., for further processing and/or display). If the density of the horizons represented within the horizon volume is determined to be less than the predetermined density threshold, operation 54 directs method 52 to an operation 56.

At operation 56, additional horizons are identified within the seismic information that corresponds to the horizon volume. In one embodiment, this includes the manual interpretation of additional horizons within the seismic information. In one embodiment, the identification of additional horizons in the seismic information is achieved via an automated algorithm. For example, the algorithm initially implemented to determine the horizon volume from the seismic data (e.g., the algorithm described by Lomask) can be used to automatically interpret the additional horizons (e.g., by reconfiguring one or more parameters of the algorithm and making another pass through the seismic information).

At an operation 58, the additional horizons identified at operation 56 are included in the horizon volume to increase the density of the horizons represented in the horizon volume. Including the additional horizons within the horizon volume may include indexing the additional horizons in the index of horizons provided by the horizon volume according to their relative chronostratigraphic times of deposition. In one embodiment, operation 58 is performed automatically according to the technique described in Lomask, or some other flattening technique.

It should be appreciated that in one embodiment, operations 56 and 58 include supplementing the existing horizon volume to increase the density of horizons represented within the horizon volume. However, this is not intended to be limiting, as the performance of operations 56 and 58, in one embodiment, include reprocessing the seismic information to generate a completely new horizon volume that represents horizons with a density greater than that of the initial horizon volume.

Figure 6:
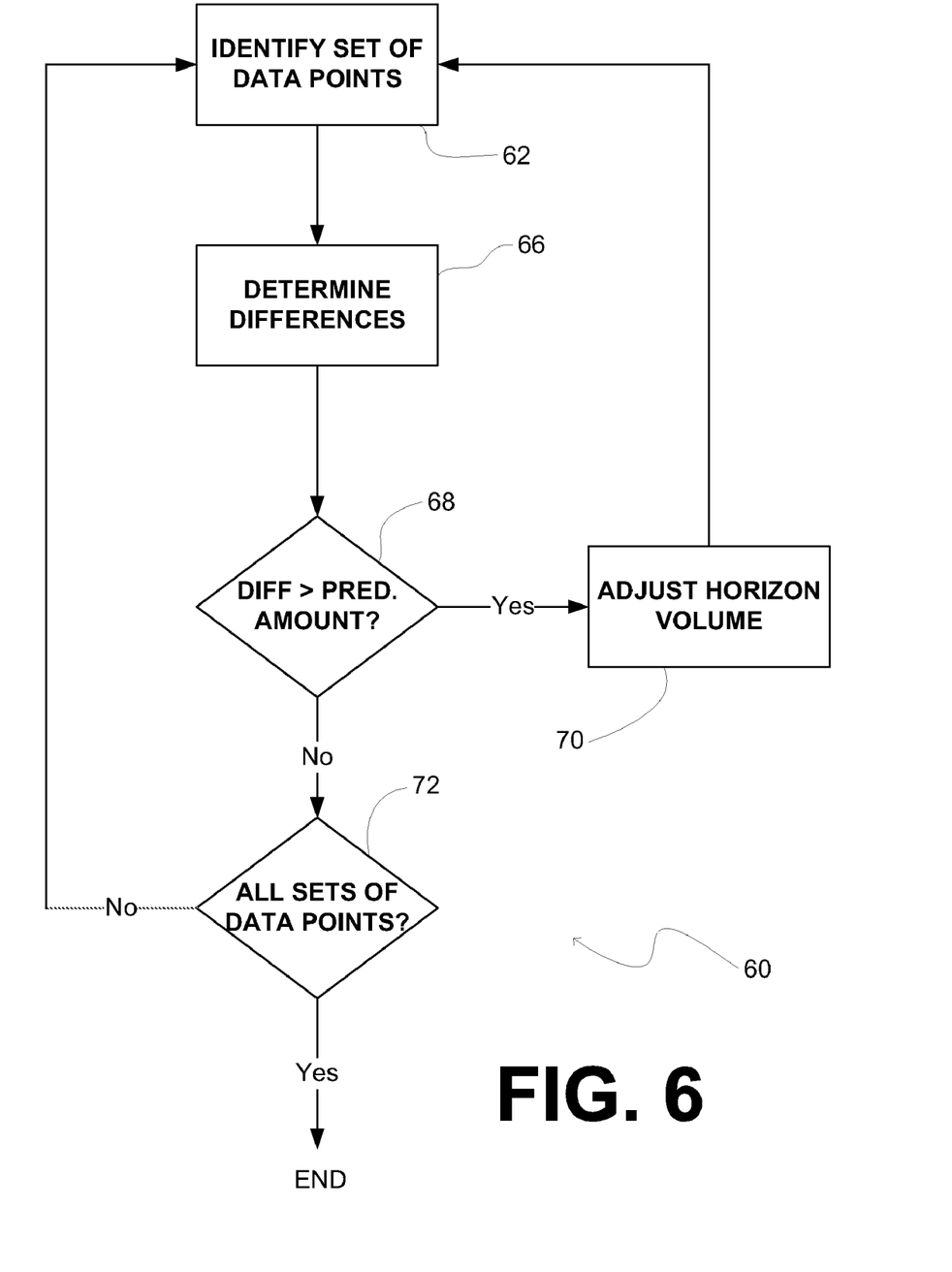
FIG. 6 illustrates a method of adjusting a horizon volume to account for compression of seismic information caused by mapping the seismic information into a flattened volume according to the horizon volume, in accordance with one embodiment of the invention.

FIG. 6 illustrates a method 60 of adjusting a horizon volume to account for compression of seismic information caused by mapping the seismic information into a flattened volume according to the horizon volume. In one embodiment, method 60 is implemented in method 42 as at least part of operation 50. In the description of method 60 and one or more of its operations below, specific reference is made to the flattening technique described in Lomask. However, this should not be viewed as limiting. Instead, method 60 should be appreciated as being usable with a variety of different flattening techniques. Further, the particular arrangement of the operations of method 60 illustrated in FIG. 6 and described hereafter is not intended to be limiting. In some implementations, various ones of the operations could be performed in an order other than the one set forth (or concomitantly with other ones of the operations), various ones of the operations may be combined with others and/or be omitted altogether, and/or various additional operations may be added without departing from the scope of the disclosure, as should be appreciated.

At an operation 62, a set of data points in the seismic information that correspond to a vertical trace through the seismic information are identified. Since the set of data points correspond to a vertical trace through the seismic information, each of the data points in the set of data points will have the same two-dimensional position in the surface plane of a subsurface volume of interest that corresponds to the seismic information.

By way of illustration, referring back to FIG. 1, the set of data points identified at operation 62 may be disposed along a vertical trace (e.g., vertical trace 64 illustrated in FIG. 1) through the seismic information. As can be appreciated from FIG. 1, each data point along vertical trace 64 will have the same two-dimensional position in the surface plane of subsurface volume of interest 12 (e.g., the same (x,y) coordinates).

Returning to FIG. 6, at an operation 66, for each pair of data points in the set of data points that are mapped by the horizon volume into positions within the flattened volume that are directly adjacent to each other (e.g., data points in the data set that are indexed to adjacent chronostratigraphic times of deposition), a difference between the values of the metric related to seismic depth for the pair of data points is determined.

In one embodiment, operations 62 and 66 are performed by analyzing the horizon volume. For example, operations 62 and 66 could be performed by taking a vertical trace through the horizon volume (which would provide the set of data points identified in operation 62), and determining the difference between the values of the metric related to seismic depth for each adjacent pair of data points along the vertical trace.

By way of illustration, referring back to FIG. 2, at horizon 20c, adjacent data points along reference trace 64 would have a fairly large difference in the value of the metric related to seismic depth. More specifically, the difference in the value of the metric related to seismic depth for these data points would correspond to region 26 shown in FIG. 1, which is omitted from flattened volume 22 in FIG. 2 due to compression.

Returning to FIG. 6, at an operation 68, a determination is made as to whether the difference between the values of the metric related to seismic depth for any of the identified data points is greater than a predetermined amount. The predetermined amount may correspond to a predetermined amount of compression that is allowable. For instance, where the predetermined amount of compression is zero (e.g., no compression is acceptable), the predetermined amount implemented by operation 68 would be the sampling interval of the seismic information (e.g., any spacing larger than the sampling interval signifies that at least one data point will be omitted from the flattened volume).

If it is determined at operation 68 that the difference between the values of the metric related to seismic time for one or more pairs of adjacent data points identified at operation 62 are greater than the predetermined amount, then method 60 proceeds to an operation 70. At operation 70, the horizon volume is re-interpolated to increase the spacing along the metric related to chronostratigraphic time between horizons that correspond to a given pair of adjacent data points from the data set identified at operation 62 that have a difference in value of the metric related to seismic depth that is greater than the predetermined amount. By increasing the spacing along the metric related to chronostratigraphic time for these horizons, the re interpolation of the horizon volume is able to include additional data points that were previously omitted.

Figure 7:
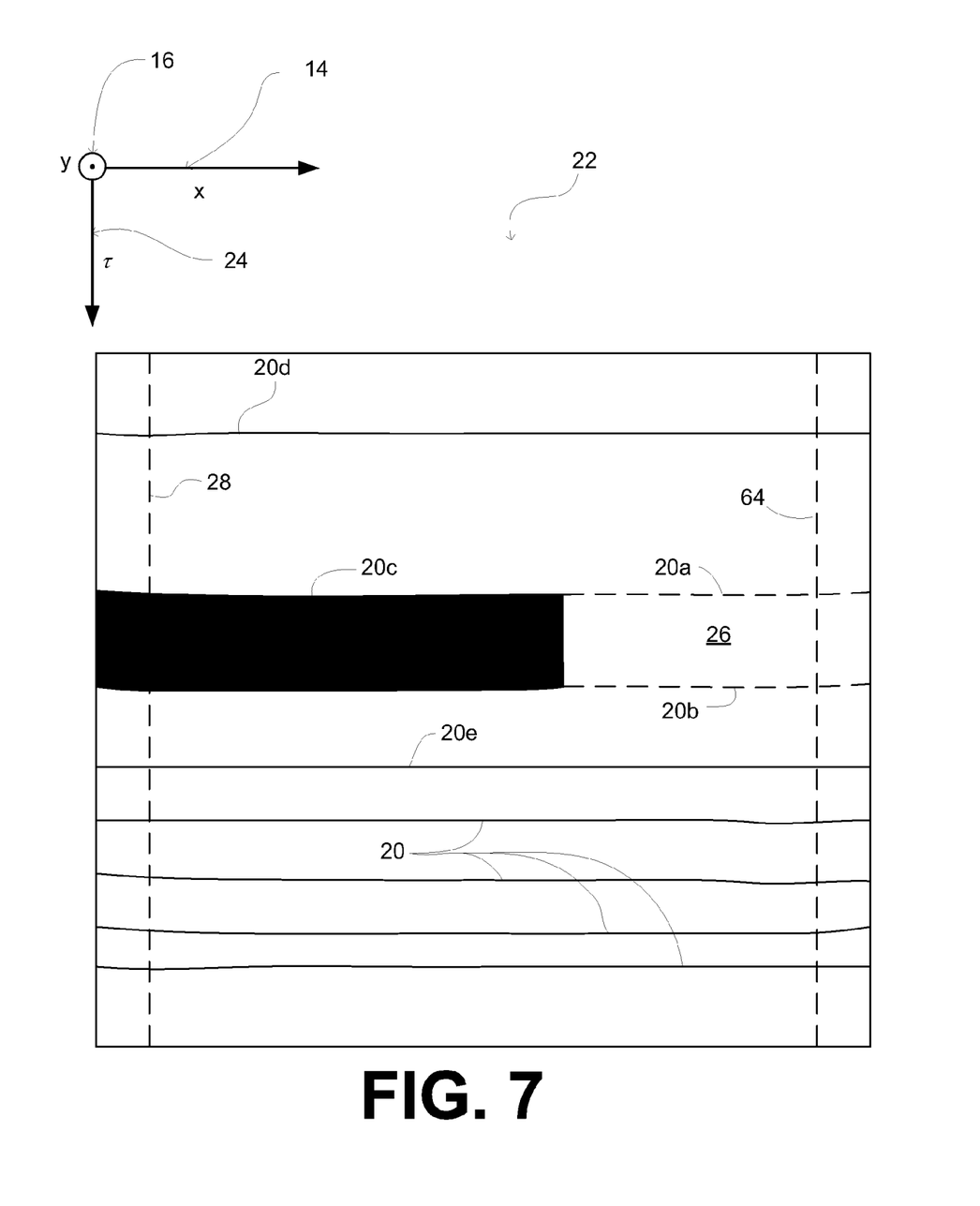
FIG. 7 illustrates an elevation view of a graphical representation of a flattened volume that corresponds to a subsurface volume of interest, according to one embodiment of the invention.

By way of illustration, FIG. 7 illustrates flattened volume 22 as defined by a re-interpolated horizon volume (e.g., as re-interpolated by operation 70). As can be seen in FIG. 7, the re-interpolation of the horizon volume stretches the spacing of flattened volume 22 between horizons 20a and 20b so that the data points corresponding to region 26 in the seismic information can be included in flattened volume 22.

Referring back to FIG. 6, if it is determined at operation 68 that no pairs of adjacent data points identified at operation 62 have a difference in values of the metric related to seismic time that is greater than the predetermined amount, then method 60 proceeds to an operation 72. At operation 72 a determination is made as to whether further sets of data points should be identified and/or analyzed (e.g., whether the spacing of horizons in the horizon volume along additional vertical traces should be analyzed). If there are further sets of data points to be identified and/or analyzed, method 60 returns to operation 62. If there are no further sets of data points to be identified and/or analyzed, the method 60 is ended (e.g., because compression has been corrected).

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A computer-implemented method of determining a horizon volume of a subsurface volume, the method comprising:
   obtaining computer-readable seismic information related to a subsurface volume, the obtained seismic information having data points that represent geological formations within the subsurface volume at an array of locations within the subsurface volume, wherein the parameters of the obtained information include (i) a two-dimensional position in a surface plane of the subsurface volume, and (ii) a metric related to seismic depth of the subsurface volume, and wherein the data points in the obtained seismic information are spaced along the metric related to seismic depth according to a sampling interval for the metric related to seismic depth; and
   determining, with a computer, a horizon volume from the obtained seismic information, wherein the horizon volume maps the obtained seismic information onto a flattened volume such that in the flattened volume, horizons represented in the obtained seismic information are shifted to be substantially coplanar with a surface defined by the horizon volume as an estimate of a single chronostratigraphic time such that the parameters of the flattened volume include (i) a two-dimensional position in the surface plane, and (ii) a metric related to chronostratigraphic time, wherein determining the horizon volume comprises:
   analyzing, with the computer, the obtained seismic information to identify horizons in the subsurface volume that are represented in the obtained seismic data;
   creating, with the computer, an initial horizon volume that orders the identified horizons by chronostratigraphic time and that associates positions within an initial flattened volume with data points included in the obtained seismic information;
   analyzing, with the computer, the initial horizon volume to determine whether mapping the obtained seismic information into the initial flattened volume according to the initial horizon volume would compress the obtained seismic information by more than a predetermined amount, wherein compression occurs if two data points in the obtained seismic information (i) have the same two-dimensional position in the surface plane, (ii) are mapped by the initial horizon volume into the initial flattened volume at directly adjacent positions, and (iii) have a difference in the metric related to seismic depth that is greater than the sampling interval for the metric related to seismic depth; and
   adjusting, with the computer, the initial horizon volume if the mapping the obtained seismic information into the initial flattened volume according to the initial horizon volume compresses the obtained seismic information by more than a predetermined amount such that mapping the obtained seismic information into an adjusted flattened volume according to the adjusted horizon volume does not compress the obtained seismic information by more than the allowable amount.

2. The method of claim 1, wherein adjusting the initial horizon volume expands the spacing between two horizons within the flattened volume such that for two data points in the obtained seismic information that (i) have the same two-dimensional position in the surface plane, (ii) were mapped by the initial horizon volume into the initial flattened volume at directly adjacent positions, and (iii) have a difference in the metric related to seismic depth that is greater than the sampling interval for the metric related to seismic depth, after the adjustment of the horizon volume, the two data points are no longer mapped into the flattened volume by the horizon volume at directly adjacent positions.

3. The method of claim 1, wherein the allowable amount of compression is zero.

4. The method of claim 1, wherein analyzing the initial horizon volume to determine whether initial horizon volume compresses the obtained seismic information comprises:
   (a) identifying a set of data points that have a common two-dimensional position in the surface plane of the subsurface volume;
   (b) for each pair of data points in the set of data points that are mapped by the initial horizon volume into positions within the flattened volume that are directly adjacent, determining a difference between the values of the metric related to seismic depth for the pair of data points; and
   (c) determining whether any of the differences determined at (b) breech a threshold value.

5. The method of claim 4, wherein analyzing the horizon volume to determine whether the initial horizon volume compresses the obtained seismic information comprises performing (a)-(c) for a plurality of sets of data points that have common two-dimensional positions in the surface plane of the subsurface volume.

6. The method of claim 1, wherein the surface defined by the horizon volume as an estimate of a single chronostratigraphic time is planar and orthogonal to an axis that corresponds to the metric related to chronostratigraphic time.

7. The method of claim 1, wherein the surface defined by the horizon volume as an estimate of a single chronostratigraphic time has a shape derived from the three-dimensional shape of a horizon in the subsurface volume that is represented in the obtained seismic information.

8. The method of claim 1, wherein the metric related to chronostratigraphic time is relative chronostratigraphic time.

9. The method of claim 1, wherein the metric related to seismic depth is seismic depth.

10. The method of claim 1, wherein the metric related to seismic depth is seismic time.

11. A computer-implemented method of determining a flattened volume from a subsurface volume, the method comprising:

obtaining computer-readable seismic information related to a subsurface volume that represents geological formations within the subsurface volume;

analyzing, with a computer, the obtained seismic information to automatically identify horizons in the subsurface volume that are represented in the obtained seismic information;

creating, with the computer, an initial horizon volume from the obtained seismic information and the identified horizons, wherein the initial horizon volume maps the obtained seismic information into a flattened volume, wherein the parameters of the flattened volume include (i) two-dimensional position on a surface that corresponds to a single chronostratigraphic time, and (ii) a metric related to chronostratigraphic time, and wherein a given one of the identified horizons is represented in the flattened volume as a surface that is substantially planar, substantially perpendicular to an axis corresponding to the metric related to chronostratigraphic time, and intersects the axis at a position corresponding to the chronostratigraphic time at which geological material of the given horizon was deposited within the subsurface volume;

analyzing, with the computer, the initial horizon volume to determine if mapping the obtained seismic information into the flattened volume according to the initial horizon volume results in compression of the obtained seismic information that omits at least some of the obtained seismic information from the flattened volume; and adjusting, with the computer, the initial horizon volume to alleviate detected compression of the obtained seismic information during mapping of the obtained seismic information onto the flattened volume.

12. The method of claim 11, wherein adjusting the horizon volume to correct for detected compression shifts one or both of a given pair of the identified horizons within the flattened volume along the axis that corresponds to the metric related to chronostratigraphic time such that the spacing between the given pair of horizons along the axis is increased by the adjustment.

13. The method of claim 12, wherein the given pair of horizons are successive within the subsurface volume.

14. A computer-implemented method of determining a horizon volume of a subsurface volume, the method comprising:

obtaining computer-readable seismic information related to a subsurface volume that represents geological formations within the subsurface volume;

analyzing, with a computer, the obtained seismic information volume to automatically identify horizons within the subsurface volume that are represented in the obtained seismic information;

creating, with the computer, an initial horizon volume from the obtained seismic information and the identified horizons, wherein the initial horizon volume maps the obtained seismic information into a flattened volume, wherein the parameters of the flattened volume include (i) two-dimensional position on a surface that corresponds to a single chronostratigraphic time, and (ii) a metric related to chronostratigraphic time, and wherein a given one of the identified horizons is represented in the flattened volume as a surface that is substantially planar, substantially perpendicular to an axis corresponding to the metric related to chronostratigraphic time, and intersects the axis at a position corresponding to the chronostratigraphic time at which geological material of the given horizon was deposited within the subsurface volume; and adjusting, with the computer, the horizon volume to expand, in the flattened volume, the spacing between a pair of the identified horizons along the axis that corresponds to the metric related to chronostratigraphic time.

15. The method of claim 14, wherein the horizon volume is adjusted to avoid compression of the obtained seismic information caused by mapping of the obtained information onto the flattened volume.

16. The method of claim 14, wherein the pair of the identified horizons are adjacent to each other.

17. A computer-implemented method of determining a horizon volume, the method comprising:

obtaining computer-readable seismic information related to a subsurface volume that represents geological formations within the subsurface volume;

analyzing the obtained seismic information to automatically identify a plurality of horizons within the subsurface volume that are represented in the obtained seismic data;

creating, with a computer, a horizon volume from the identified horizons that orders the identified horizons according to chronostratigraphic time of deposition;

comparing, with the computer, a density of the identified horizons in the horizon volume with a predetermined density threshold; and adjusting, with the computer, the horizon volume such that the density of the identified horizons in the horizon volume is greater than the predetermined density threshold if the density of the identified horizons in the horizon volume is initially less than the predetermined density threshold.

18. The method of claim 17, wherein adjusting the horizon volume comprises:

identifying one or more additional horizons within the subsurface volume that are represented in the obtained seismic information; and including the identified one or more additional horizons in the horizon volume according to their relative chronostratigraphic time of deposition.

19. The method of claim 18, wherein identifying one or more additional horizons within the subsurface volume that are represented in the obtained seismic information is performed automatically.

20. The method of claim 17, wherein the identified horizons are automatically ordered to create the horizon volume.

21. The method of claim 17, further comprising implementing the horizon volume to index and/or access the subsurface volume by relative chronostratigraphic time of deposition.

22. The method of claim 17, further comprising analyzing the horizon volume to determine information related to geological properties of interest for the subsurface volume.

23. A computer-implemented method of determining a horizon volume, the method comprising:

obtaining computer-readable seismic information related to a subsurface volume that represents geological formations within the subsurface volume;

analyzing, with a computer, the obtained seismic information to automatically identify a plurality of horizons within the subsurface volume that are represented in the obtained seismic information;

creating, with the computer, a horizon volume from the identified horizons that orders the identified horizons according to chronostratigraphic time of deposition; and adjusting, with the computer, the horizon volume such that the identified horizons are indexed in the horizon volume by chronostratigraphic time of deposition uniformly as a function of chronostratigraphic time of deposition.

24. The method of claim 23, wherein the identified horizons are automatically ordered to create the horizon volume.

25. The method of claim 23, wherein the identified horizons are automatically indexed by chronostratigraphic time of deposition.

26. The method of claim 23, further comprising implementing the horizon volume to access the subsurface volume by relative chronostratigraphic time of deposition.

27. The method of claim 23, further comprising analyzing the horizon volume to determine information related to geological properties of interest for the subsurface volume.

* * * * *